(No Model.)
H. BUSHNELL.
ROD PACKING.
No. 351,828. Patented Nov. 2, 1886.
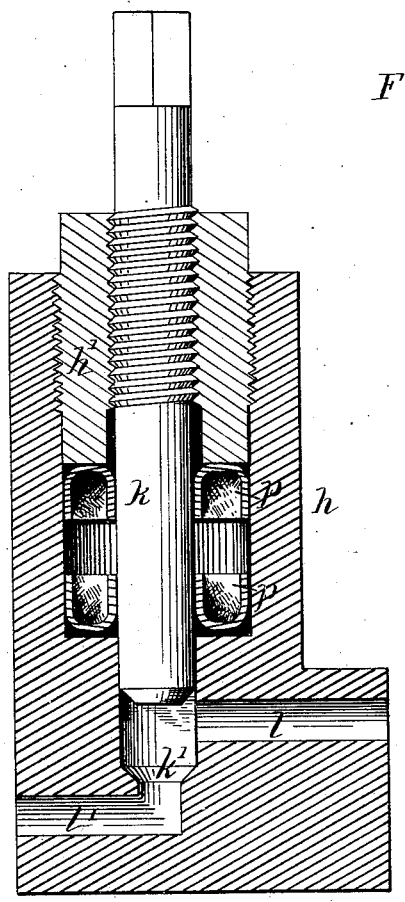
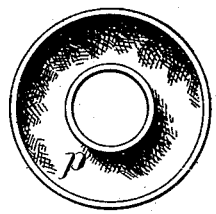
WITNESSES:
George L. Barnes
John H. Whiting
INVENTOR
Henry Bushnell.
BY
Julius Twiss,
ATTORNEY

UNITED STATES PATENT OFFICE.

HENRY BUSHNELL, OF NEW HAVEN, CONNECTICUT.

ROD-PACKING.

SPECIFICATION forming part of Letters Patent No. 351,828, dated November 2, 1886.

Application filed April 6, 1886. Serial No. 198,016. (No model.)

*To all whom it may concern:*

Be it known that I, HENRY BUSHNELL, a resident of New Haven, in the State of Connecticut, have invented a new and useful Improvement in Rod-Packing, of which the following is a specification.

My invention has for its object to provide a self-adjusting packing for throttle valve stems, and is especially adapted for use in compressed-air engines or other motors in which a cold expansive medium is used.

The invention consists in a novel arrangement of flexible packing-collars and filling composition, as hereinafter more fully described and claimed.

In the accompanying drawings, Figure 1 is a sectional view of a throttle-valve fitted with my improved self-adjusting packing device, and Fig. 2 is a perspective view of one of the flexible packing-collars.

Referring to the drawings, $h$ designates the stuffing-box or hollow neck of the valve, centrally through which the valve-spindle $k$ is arranged. The lower end of the valve-spindle is received in a step at the bottom of the stuffing-box cavity, and is formed conical, as shown. The conical end fits a corresponding seat, $k'$, at the bottom of the valve-step. The valve-port $l'$ opens into the center of the valve-seat $k'$ and communicates, when the valve-spindle is raised, with a corresponding outlet, $l$, adjacent to the valve-seat. A pair of cupped collars, $p$, formed of leather or other suitable flexible material, are inserted in the stuffing-box cavity face to face around the valve-spindle. The exterior rim or flange of each collar bears against the walls of the stuffing-box, while the interior rims or flanges of the same encircle the valve-spindle. The cavity or space between the cups is filled with a thick and yielding composition or substance of such consistency that it cannot readily be forced through a small aperture or passage. A superior composition for this purpose may be made of melted beeswax, rosin, and tallow. The packing-collars are held in the stuffing-box cavity by an adjusting gland or bushing, $h'$, which screws into the stuffing-box. The bushing is threaded to receive the valve-spindle $k$, which is raised or lowered by being turned therein.

In operation, when the pressure of an elastic fluid is exerted upon the lower side of the packing-collars the flanges or rims of the cups are pressed firmly against the walls of the stuffing-box and around the valve-spindle, thereby forming a tight joint, which effectually prevents the escape of the fluid. Several pairs of cupped collars with interposed filling may be used in one valve, when required. It will be seen that the stuffing-box is not kept tight by the pressure of the gland or bushing $h'$, as in the case of ordinary stuffing-boxes; but the packing is always tight whenever there is an elastic medium beneath it, and is therefore a self-adjusting and efficient packing.

I claim as new and desire to secure by Letters Patent—

The combination, with a valve-stem, of a pair of cupped collars, of leather or other flexible material, arranged face to face within the stuffing-box cavity around the valve-stem and filled with a thick and yielding composition or substance, all arranged substantially in the manner and for the purpose described.

HENRY BUSHNELL.

Witnesses:
GEORGE L. BARNES,
WM. J. ROOT.